United States Patent
Jordan, Jr.

[15] 3,676,306
[45] July 11, 1972

[54] SEPARATION OF PURIFIED VINYLIDENE CHLORIDE

[72] Inventor: James I. Jordan, Jr., 1512 Kenilworth Parkway, Baton Rouge, La. 70808

[22] Filed: July 8, 1970

[21] Appl. No.: 53,329

[52] U.S. Cl. .............................203/8, 203/34, 260/654 S, 260/654.5
[51] Int. Cl. .......................................B01d 3/34, C07c 17/40
[58] Field of Search ............260/652.5, 652 P, 654 R, 654 D, 260/654 A, 654 S; 203/8, 9, 34

[56] References Cited

UNITED STATES PATENTS

| | | | |
|---|---|---|---|
| 3,304,336 | 2/1967 | Callahan | 260/654 D |
| 2,803,678 | 8/1957 | Conrad | 260/654 D X |
| 2,136,347 | 11/1938 | Wiley | 260/652.5 P |
| 2,160,944 | 6/1939 | Coleman et al. | 260/652.5 P |
| 3,346,651 | 10/1967 | Moakes | 260/652.5 P |
| 2,915,565 | 12/1959 | Jacobowsky et al. | 260/654 R |

*Primary Examiner*—Howard T. Mars
*Attorney*—Burns, Doane, Benedict, Swecker & Mathis

[57] ABSTRACT

The normal tendency of vinylidene chloride to polymerize on heating is repressed by the addition of hydrogen chloride to the system. Thus, for instance, vinylidene chloride can be separated from methylchloroform or other higher boiling compounds without undue polymerization by fractionally distilling the mixture at atmospheric or superatmospheric pressure and injecting hydrogen chloride into the distillation system.

3 Claims, No Drawings

SEPARATION OF PURIFIED VINYLIDENE CHLORIDE

BACKGROUND OF INVENTION

Vinylidene chloride is a colorless, volatile liquid which is widely used in making synthetic resins either by homopolymerization or particularly by copolymerization with other ethylenically unsaturated monomers such as vinyl chloride or acrylonitrile. Pure vinylidene chloride monomer, free of oxygen, polymerizes very slowly. However, as ordinarily, prepared, vinylidene chloride polymerizes readily at temperatures above 0° C. Oxygen dissolved in the monomer reacts to form peroxides and acid chlorides which catalyze the polymerization reaction unless an appropriate polymerization inhibitor is added.

The separation of vinylidene chloride (b.p. 32° C.) from higher boiling compounds which have become admixed with the vinylidene chloride either during its manufacture or, in the case of inhibitors or the like, by deliberate subsequent addition, has always presented a major problem. The separation is most conveniently carried out by fractional distillation but as the vinylidene chloride concentrates in the upper portion of the column and the overhead condenser, formation of polyvinylidene chloride takes place with the result that the equipment becomes fouled or plugged and product is lost.

In the past this problem of polymerization has been minimized by operating the distillation at low temperature by the use of low pressure. This has lengthened the time required between shut-downs for cleaning the polymer coated columns and condensers. These cleanings are costly or even hazardous because when polymerization of vinylidene chloride takes place in an uncontrolled condition peroxides or acetylenic compounds may form which can explode violently in the dry state and must be very carefully handled by special procedures during clean out. On the other hand, operating a distillation system at subatmospheric pressures brings about difficulties of its own and tends to increase operating costs substantially.

OBJECTS AND SUMMARY OF INVENTION

It is therefore among the objects of this invention to provide a new means of inhibiting the polymerization of vinylidene chloride, and particularly to inhibit its polymerization at temperatures of about 25° C. or higher.

A more particular object is to minimize the fouling of equipment in which vinylidene chloride is contained or distilled at temperatures near its boiling point or higher, i.e., in circumstances where the addition of a high boiling polymerization inhibitor is relatively ineffective as far as the prevention of polymerization in the vapor space is concerned.

Another object of the invention is to provide a process for separating vinylidene chloride by fractional distillation from higher boiling compounds, e.g., from chlorinated hydrocarbons such as methylchloroform or from high boiling polymerization inhibitors of various types, without requiring such a distillation to be conducted at subatmospheric pressure.

According to the present invention, these and other objects are achieved by injecting hydrogen chloride into the system wherein the vinylidene chloride is contained or distilled.

DESCRIPTION OF THE INVENTION AND ITS PREFERRED EMBODIMENT

The invention is particularly suitable for use in dynamic systems, e.g., in processing equipment such as distillation columns and associated pieces of hardware which are used to separate purified vinylidene chloride from higher boiling compounds by the application of heat.

Generally speaking, in accordance with this invention, undesirable polymerization of vinylidene chloride is avoided or minimized by injecting hydrogen chloride into the system in a proportion sufficient to provide at least about 6.6, and preferably between about 6.6 and 26, mole percent of an acidic vapor such as a hydrogen halide in the vapor space of the system. Hydrogen chloride gas is most convenient to use and is therefore preferred.

Vinylidene chloride can be made by a variety of different processes, but all of the more practical ones involve the dehydrohalogenation of a more fully halogenated ethane. For instance, vinylidene chloride can be made by dehydrochlorinating 1,1,2-trichloroethane or 1,1,1-trichloroethane either non-catalytically or catalytically. A particularly convenient process for making vinylidene chloride involves the dehydrochlorination of 1,1,1-trichloroethane in liquid phase using ferric chloride as a catalyst. Of course, in all such processes the recovery of pure vinylidene chloride requires its separation from any unconverted feed material and from by-products which may be formed in the process.

The present invention is applicable to the treatment of liquid mixtures which contain vinylidene chloride either in major proportion, i.e., in a concentration of from between about 50 to about 99.8 weight percent or more, or in minor proportion, i.e., in a concentration lower than 50 weight percent and as low as 0.5 weight percent. The other components of such mixtures may be other halogenated hydrocarbons such as 1,1,1- or 1,1,2-trichloroethane, 1,1- or 1,2-dichloroethane or other halogenated liquid hydrocarbons having a boiling point higher than that of vinylidene chloride. The invention is also useful in removing polymerization inhibitors from vinylidene chloride which have been added thereto in a small amount, e.g., between 0.2 and 5 weight percent, to prevent polymerization during storage or shipment. As is well known, such inhibitors may be, for instance, phenolic compounds such as 2,6-di-tertiary butyl para-cresol, or amines such as phenylenediamines, or alkynols such as 1-ethynylcyclohexanol. Usually it is desirable to remove such inhibitors from the polymerizable monomer before it is used in a polymerization reaction.

It is preferred to use substantially anhydrous hydrogen chloride gas but hydrogen chloride containing up to about 0.1 percent water can be used also.

When dealing with a dynamic system such as a continuous distillation process, HCl may be added either periodically or preferably continuously. In the case of a distillation column it is preferred to add the hydrogen chloride in a lower portion of the column, e.g., it may be bubbled into the boiling liquid in the still, or it may be introduced above the level of the boiling liquid in the still or higher in the fractionation column. To insure maximum protection it may sometimes be desirable to inject HCl at several different points in the system, e.g., in the still at the bottom of the column as well as in an upper portion of the column and/or in the condenser where the vaporized vinylidene chloride is condensed. It is desirable to feed HCl to the system in a proportion of between about 6.6 to 27 mole percent based on the total liquid feed.

In operating a fractional distillation column in accordance with this invention, the inlet temperature of the water that is used in the condenser may be adjusted to the preferred condensation temperature, e.g., between about 7° and 10° C., by refrigeration or by injection of a suitable proportion of steam as and when necessary.

Liquid and uncondensed vapor then passes from the condenser to a reflux drum where the vapor and liquid are separated, the vapor being passed through a control valve which is used to maintain a constant, slightly superatmospheric pressure on the system, e.g., a pressure of at least 1 p.s.i.g. For instance, the distillation column may desirably be maintained at a pressure of between about 1 and 1.2 atmosphere such that the overhead temperature in the column is maintained between about 30° and 45° C. If insufficient vapor is available in the process itself for pressure control, an extraneous inert gas such as nitrogen may be metered into the system in a suitable amount ahead of the pressure control valve. A portion of the liquid vinylidene chloride which accumulates in the reflux drum is preferably sent back to the top of the distillation tower as reflux in accordance with conventional practice.

The invention will next be further illustrated in terms of two comparative distillation runs, the first one being representative of the prior art and the second one being an illustration of the invention.

RUN NO. 1 (PRIOR ART)

A mixture containing 90.5 percent by weight of vinylidene chloride and 9.5 percent by weight 1,1,1-trichloroethane is fed continuously in pilot plant equipment to the still of a packed distillation tower which is equipped with a water cooled condenser, a reflux drum where the purified vinylidene chloride condensate is separated from the uncondensed vapors, and a collection tank. The system is operated continuously for about 60 hours at the following average conditions:

| | |
|---|---|
| System Pressure (Vapor Effluent from Reflux Drum) | 2 to 3 p.s.i.g. |
| Still Temperature | 78°C. |
| Temperature at Top of Column | 38°–42°C. |
| Condenser Outlet Temperature | 7°–10°C. |

The vent gas leaving the system is scrubbed in water in a vent scrubber. The pH of the water leaving the scrubber is essentially the same as the feed water showing that no noticeable hydrogen chloride is produced by decomposition of the trichloroethane or present from any other source.

When the unit is shut down and disassembled, a 1-inch layer of white polymeric material is found in the reflux drum, the reflux line from the drum to the distillation tower is found to be heavily coated with white polymer and a thin white film is present in the overhead vapor line.

RUN NO. 2 (INVENTION)

A mixture containing 90 percent by weight vinylidene chloride and 10 percent by weight 1,1,1-trichloroethane is fed continuously to the still of the same distillation equipment as was described in connection with Run No. 1 above. A flow of anhydrous hydrogen chloride gas to the still is established at a rate of 0.45 pounds per pound of liquid feed mixture. The average conditions during about 150 hours of operation are as follows:

| | |
|---|---|
| System Pressure | 2 to 3 p.s.i.g. |
| Still Temperature | 75°C. |
| Overhead Temperature | 35°C. |
| Condenser Outlet Temperature | 4.4°–13°C. |

The condensate from the water cooled condenser, which represents the purified vinylidene chloride stream, is found to contain from 0.5 to 3.0 percent by weight hydrogen chloride in the course of the run. When the unit is disassembled and inspected at the end of this run, no significant evidence of polymer formation is found except for a very thin white film at the top of the tower and in the line from the condenser to the reflux drum.

A comparison of these two runs illustrates that the presence of hydrogen chloride in a liquid containing a high concentration of vinylidene chloride will inhibit the formation of unwanted polymers. The system may be operated at temperatures which may be above the atmospheric boiling point of vinylidene chloride, i.e., above about 30° C. and as high as 80° C. or even higher, permitting operation under positive pressure.

The invention is particularly pointed out in the appended claims.

I claim:

1. In a process for separating purified vinylidene chloride from a liquid feed mixture comprising a major proportion of vinylidene chloride and a minor proportion of chlorinated ethane from the group consisting of 1,1-dichloroethane, 1,2-dichloroethane, 1,1,1-trichloroethane, and 1,1,2-trichloroethane by fractionally distilling said feed mixture in a distillation zone containing boiling liquid feed mixture in a lower portion and vinylidene chloride containing vapors in a vapor space in an upper portion of said zone, the improvement which consists essentially in adding hydrogen chloride to said distillation zone in a proportion which provides between about 6.6 and 26 mole percent HCl in the vapor space of said distillation zone, boiling and fractionally distilling said mixture in the presence of the added HCl in said distillation zone under positive pressure at a temperature above about 30° C. and up to about 80° C., cooling the resulting vapor mixture of vinylidene chloride and hydrogen chloride to condense purified vinylidene chloride therefrom, and recovering the resulting purified vinylidene chloride.

2. A process according to claim 1 wherein said liquid feed mixture consists essentially of a major proportion of vinylidene chloride and a minor proportion of trichloroethane.

3. A process according to claim 1 wherein said liquid feed mixture consists essentially of a major proportion of vinylidene chloride and a minor proportion of trichloroethane and wherein said positive pressure in the distillation zone is maintained substantially constant between about 1 and 1.2 atmosphere which is preselected to maintain an overhead temperature in the distillation zone within a predetermined range between about 30° and 45° C., and wherein condensed vinylidene chloride is recovered separate from hydrogen chloride vapor.

* * * * *